April 13, 1965 K. G. BOREN ETAL 3,177,677
ABSORPTION REFRIGERATION
Original Filed Jan. 11, 1961 3 Sheets-Sheet 3

INVENTORS
Karl Brunner Boren
BY Paul Herbert Cronelid
Ulf Fernander
THEIR ATTORNEY

United States Patent Office 3,177,677
Patented Apr. 13, 1965

3,177,677
ABSORPTION REFRIGERATION
Karl Gunnar Boren, Vallingby, Sweden, and Paul Herbert Cronelid, Cuttack, Orissa, India, assignors to Aktiebolaget Electrolux, Stockholm, Sweden, a corporation of Sweden
Continuation of abandoned application Ser. No. 82,034, Jan. 11, 1961. This application Jan. 27, 1964, Ser. No. 340,167
Claims priority, application Sweden, Jan. 12, 1960, 247/60
18 Claims. (Cl. 62—236)

This invention relates to absorption refrigeration apparatus of the kind in which vapor is expelled out of solution by heating. This application is a continuation of our application Serial No. 82,034, filed January 11, 1961, now abandoned.

It is an object of the invention to provide for absorption refrigeration apparatus an improved heating structure which is suitable for operation by different sources of heat, each of which alone is capable of supplying heat at an adequate rate and at a sufficiently elevated temperature to effect normal operation of the refrigeration apparatus under all conditions under which the apparatus is intended to be operated.

Another object of the invention is to provide for a vapor-expulsion unit of absorption refrigeration apparatus improved heating structure of this type which can be operated by different sources of electrical energy and the operation of which can be shifted at will from one source of electrical energy to the other.

A further object of the invention is to provide for a vapor-expulsion unit of absorption refrigeration apparatus improved heating structure of this type which can be operated either by an electrical heater or a fluid fuel burner and the operation of which can be conveniently shifted from one source of heat to the other.

A still further object of the invention is to provide for a vapor-expulsion unit of absorption refrigeration apparatus an improved heating structure of this type in which one source of heat cannot be rendered operable to supply heat to the vapor-expulsion unit when the refrigeration apparatus is being operated by the other source of heat.

The invention, together with the above and other objects and advantages thereof, will be more fully understood upon reference to the following description and the accompanying drawing forming a part of this specification, and in which.

Figure 1:
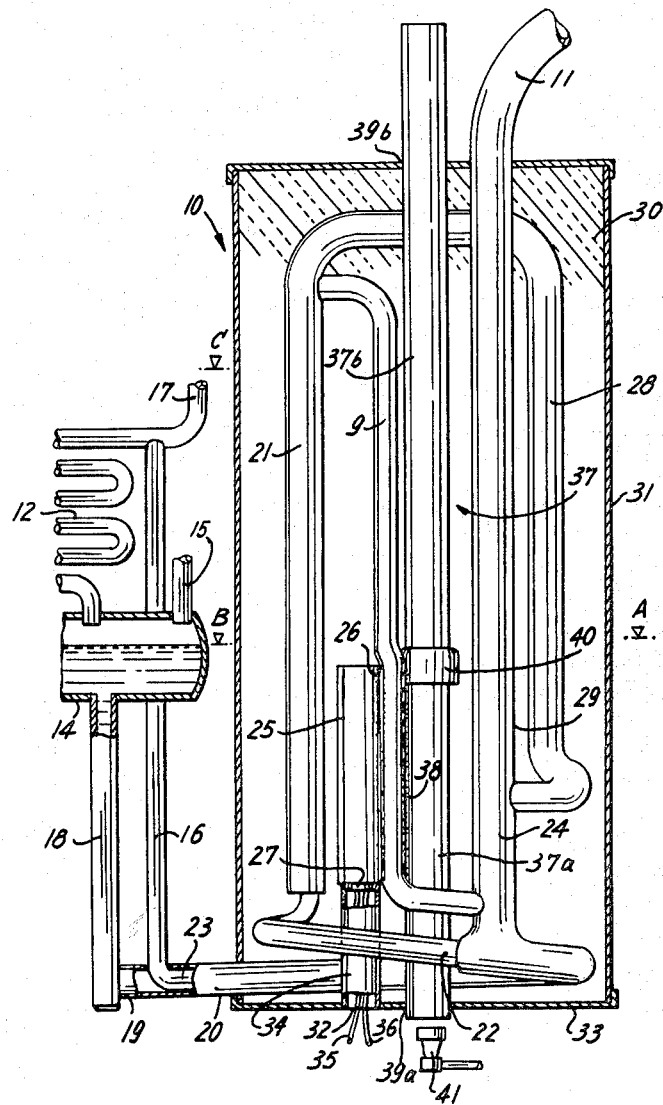
FIG. 1 illustrates more or less diagrammatically an absorption liquid circuit of absorption refrigeration apparatus including a generator or vapor-expulsion unit embodying the invention.

In the drawing, the invention is embodied in absorption refrigeration apparatus of a uniform pressure type containing an inert pressure equalizing gas. Refrigerant vapor is expelled from absorption liquid in a vapor lift pipe 9 of vapor-expulsion unit 10, and, in a manner to be described presently, passes through a conduit 11 to a condenser. The refrigerant vapor, such as ammonia, is liquefied in the condenser and flows into an evaporator in which the refrigerant evaporates and diffuses into an inert gas, such as hydrogen, to produce a refrigerating effect. The resulting gas mixture of refrigerant and inert gas flows from the evaporator to an absorber which may be of an air-cooled type including a coil 12 and an absorber vessel 14 to which the lower end of the coil is connected, such gas mixture entering the absorber vessel 14 through a conduit 15.

In the absorber refrigerant is absorbed from the gas mixture into absorption liquid, such as water, which is delivered thereto through a conduit 16, and the absorption liquid enriched in refrigerant passes into the absorber vessel 14. The inert gas is returned from the absorber to the evaporator in the path of flow including a conduit 17, and the enriched absorption liquid is conducted through a conduit 18 and outer pipe 19 of a liquid heat exchanger 20 to the vapor-expulsion unit 10.

The absorption liquid from which refrigerant vapor has been expelled, which is referred to as weak absorption liquid, flows from the lower end of standpipe 21 into a conduit 22 which is connected to the inner pipe 23 of liquid heat exchanger 20. From the inner passage of liquid heat exchanger 20 weak absorption liquid flows upwardly through conduit 16 into the upper part of the absorber to absorb refrigerant vapor. In order to simplify the drawing, the condenser, evaporator and connections therefor have not been shown, such parts being well known and their illustration not being necessary for an understanding of this invention.

Absorption solution enriched in refrigerant flows from the absorber vessel 14 through conduit 18 and outer pipe 19 of liquid heat exchanger 20 into a vertically extending standpipe 24. The extreme lower end of pipe 24 is in communication with the lower end of vapor lift pipe 9 which is in thermal exchange relation with a heating tube 25 at 26, as by welding, for example. The heating tube 25 is arranged to be heated by an electrical heating element 27 disposed within the tube.

The part of the pump or lift pipe 9 in thermal exchange relation with the heating tube 25 may be referred to as the vapor-forming part, in which vapor bubbles are formed due to heat derived from the heating tube. Due to the formation of these vapor bubbles which tend to collect and become larger and larger, liquid in the vapor lift pipe 9 becomes segregated, whereby slugs of liquid are caused to rise in the lift pipe by vapor lift action. Upward movement is imparted to liquid in the vapor lift pipe 9 under the influence of a "reaction head" formed by the liquid column maintained in standpipe 24.

Vapor generated in the vapor lift pipe 9 flows from the upper end thereof through the upper part of standpipe 21 and a conduit 28 to a region 29 in pipe 24 which serves as an analyzer and is disposed below the liquid surface level A of the liquid column contained therein, the liquid level A being essentially the same as the liquid level B in the absorber vessel 14. The absorption liquid introduced into the analyzer 29 is relatively rich in refrigerant and at a lower temperature than the generated vapor, and, in bubbling through the enriched solution, water vapor present in the vapor is cooled sufficiently and condenses and in this way is removed from ammonia vapor. From the analyzer 29 refrigerant vapor flows upwardly in pipe 24 into conduit 11 and passes to the condenser, as previously explained.

The absorption liquid from which refrigerant vapor has been expelled flows by gravity from standpipe 21 through the inner pipe 23 of liquid heat exchanger 20 and conduit 16 into the upper part of absorber coil 12. The liquid surface level C maintained in standpipe 21 is at a higher level than the region at which liquid is introduced into absorber 12 from the upper end of conduit 16.

The vapor-expulsion unit 10 in its entirety, together with a major portion of the liquid heat exchanger 20, are embedded in a body of insulation 30 retained in a metal shell or casing 31 having an opening 32 at the bottom 33 thereof, the shell being rectangular or circular in horizontal cross-section. The heating tube 25 is embedded in a part of the insulation 30 which is intermediate the ends thereof and spaced from the top and bottom ends of the shell 30. The electrical heating element 27 is arranged to be positioned within the heating tube 25 through a hollow sleeve member 34 which is formed of suitable insulating material and extends from the bottom of the heating tube 25 to the bottom opening 32 in the shell 31.

The electrical conductors 35 and 36 for the electrical heating element 27 extend through the hollow sleeve member 34. The heating tube 25 snugly receives the heating element 27 which may comprise a cartridge housing an electrical wire or the like having a relatively high resistance that generates heat when connected to a source of electrical energy.

The vapor-expulsion unit or generator 10 of FIG. 1 is formed of piping to provide a compact bundle or cluster of parts which is elongated in the vertical direction and is relatively narrow in horizontal cross-section. Thus, the heating tube 25, vapor lift pipe 9, standpipes 21 and 24 and pipe 28 are formed of pipes or conduits disposed closely adjacent to one another, although they are diagrammatically illustrated in a single plane in FIG. 1 in order to simplify the drawing. In order to reduce radiation heat losses and conserve heat, it is usually the practice to embed the parts of the generator or vapor-expulsion unit 10 in a body of insulation having a passage therein which extends to the exterior of the insulating body, so that the electrical heating element 27 may be readily inserted into and removed from the heating tube 25.

In accordance with this invention, the vapor-expulsion unit 10 is arranged to be operated at will by two independent sources of heat, each of which alone is capable of supplying heat at an adequate rate and at a sufficiently elevated temperature to the vapor lift pipe to effect normal operation of the refrigeration apparatus under all conditions under which the apparatus is intended to be operated. This is accomplished by providing a second heating flue 37 which includes bottom and top tubes 37a and 37b, respectively, the vapor-forming part of the vapor lift pipe 9 being in thermal exchange relation with the bottom heating tube 37a at 38, as by welding, for example. Hence, the same vertical zone of the vapor lift pipe 9 is in thermal exchange relation with both the heating tube 25 and the heating flue 37.

The bottom heating tube 37a projects through a bottom opening 39a in the shell 31, and the top heating tube 37b projects through a top opening 39b in the shell and is formed with an enlarged end or collar 40 at its lower end which fits snugly over the upper end of the bottom heating tube 37a. A suitable fluid fuel burner 41 is arranged to be supported in an upright position in any suitable manner at the bottom end of the heating flue, so that the combustion gases will be used most effectively for heating the heating flue 37.

In view of the foregoing, it will now be understood that the heating tube 25, which forms a permanent part of the refrigeration apparatus, may be employed as a component of the heating structure suitable for electrical operation; and that the heating flue 37, which also forms a permanent part of the refrigeration apparatus, may be employed as a component of the heating structure suitable for operation by a burner to which a fluid fuel, such as gas or kerosene, for example, is adapted to be supplied. The burner 41 and heating flue 37 operatively associated therewith function as a gas burner heating means operable to maintain a flame burning in the atmosphere for producing combustion gases at an elevated temperature and for expelling refrigerant vapor out of solution in the generator member 9 by heat derived from the combustion gases substantially at the elevated temperature.

It will now be understood that the vapor lift pipe or tube 9 forms the place of heating in the refrigeration apparatus and functions as the only heat receiving member of the apparatus and through which liquid is raised by vapor-liquid lift action for circulating solution in the absorption solution circuit. The pipe or tube 9 has an upstanding outer side wall which defines a vertical space which holds a column of absorption solution. The hollow sleeves 25 and 37a are disposed exteriorly of the upright tube 9 and function as first and second heating members, respectively. The exterior surfaces of the sleeves 25 and 37a are welded at 26 and 38, respectively, to the upstanding outer side wall of the tube or pipe 9, whereby the column of absorption solution in the tube 9 always receives heat at its outer periphery from each of the hollow sleeves or heating members 25 and 37a. The hollow sleeves 25 and 37a are laterally spaced from one another with both of the hollow sleeves being disposed outside of each other and permanently connected to the same vertical pipe 9 of the heat receiving structure of the refrigeration apparatus.

When refrigeration apparatus like that illustrated in FIG. 1 is intended to be operated electrically, the electrical conductors 35 and 36 are connected to a suitable source of electrical supply. When the refrigeration apparatus of FIG. 1 is intended to be operated by a fluid fuel, the burner 41 is connected to a source of supply of the fuel and ignited.

If the electrical heating element 27 and burner 41 inadvertently were operated at the same time, the vapor-expulsion unit 10 would be subject to excessive heating which would tend to shorten the life of the refrigeration apparatus. It is therefore desirable to protect the refrigeration apparatus so that, when the apparatus is being operated by one source of heat, the other source of heat cannot be rendered operable to supply heat to the vapor-expulsion unit 10. Such a protective arrangement is diagrammatically shown in FIG. 3 in which the electrical heating element 27 is connected to a source of electrical energy by conductors 35 and 36, a switch 42 being connected in the conductor 35. The burner 41 is connected to a source of gaseous fuel, for example, by a pipe 43 in which are connected a manually operated valve 44 and a solenoid operated valve 45 normally held in an open position by a spring 46.

The valve 44 is provided with an operating handle 44a which is formed of insulating material and upon which is mounted a contact bar 44b adapted to bridge a pair of spaced contacts 44c when the handle is moved from its valve closed position (solid lines) to its valve open position (dotted lines). When the switch 42 is open and the valve 44 is open and the handle 44a is in its dotted line position, the contact bar 44b completes a circuit for relay 47 which is connected to the same source of electrical energy as the conductors 35 and 36. This circuit for relay 47 is completed across the normally closed contacts 48 of relay 49 which is de-energized when switch 42 is open. When the relay 47 is energized the normally closed contacts 50 of this relay open and the circuit for the electrical heating element 27 cannot be completed when switch 42 is closed. The circuit for the electrical heating element 27 will be completed by switch 42 only when the handle 44a of valve 44 is moved from its open operable position (dotted lines) to its closed inoperable position (solid lines).

When the handle 44a of valve 44 is in its closed position (solid lines) and switch 42 is closed to complete an electric circuit for heating element 27, relay 49 is energized to open contacts 48 of this relay and solenoid 51 is energized to close valve 45 against the tension of spring 46. When the handle 44a is now moved to its dotted line position to open valve 44, fuel cannot be supplied to burner 41 because solenoid 51 is energized to keep valve 45 in its closed position. Further, a circuit cannot be completed for relay 47 when contact bar 44b bridges contacts 44c because relay 49 is energized and the contacts 48 of this relay are open due to closing of switch 42.

Figure 3:
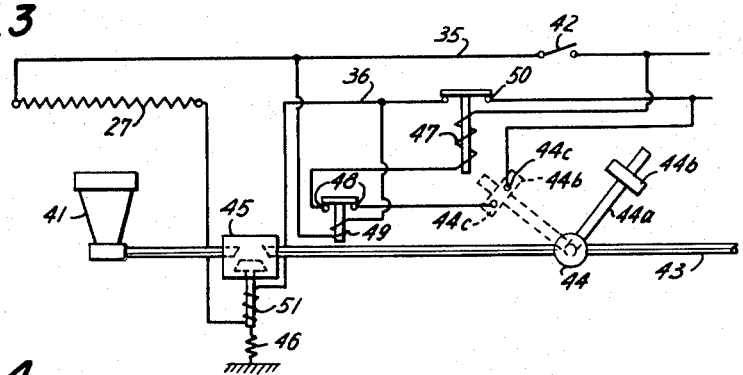
FIGS. 3 and 4 are diagrammatic representations of circuits for controlling the heating of the vapor-expulsion unit shown in FIG. 1.

Gaseous fuel will be supplied to burner 41 only when the movable arm of switch 42 is moved from its closed operable position to its open inoperable position illustrated in FIG. 3.

Figure 4:
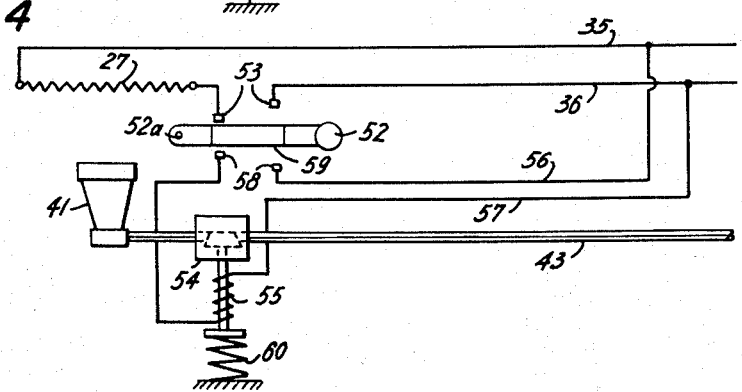

In the control arrangement of FIG. 3, each source of heat employed to operate the refrigeration apparatus cannot be disturbed when an attempt is made to operate the apparatus by the other source of heat and will continue to operate the refrigeration apparatus until it is rendered inoperable to supply heat to the vapor-expulsion unit 10. In FIG. 4 is shown another arrangement for controlling the sources of heat in which a single control member 52 is employed to render one or the other heat source operable to supply heat to the vapor-expulsion unit 10. In FIG. 4 the heating element 27 is connected by conductors 35 and 36 to a source of electrical supply, a pair of spaced contacts 53 being provided in conductor 36; and the burner 41 is connected to a source of gaseous fuel, for example, by a pipe 43 in which is connected a solenoid operated valve 54 having a solenoid 55 connected by conductors 56 and 57 to the same source of electrical supply as the conductors 35 and 36. A pair of spaced contacts 58 are provided in conductor 56.

The control member 52, which is pivoted at 52a, is formed of insulating material and includes the electrically conductive section 59, bridges the contacts 53 and completes a circuit for heating element 27 when it is moved upward from its horizontal position shown in FIG. 4. With heating element 27 energized, solenoid 55 is de-energized and valve 54 is urged upward to its closed position by the action of a resilient element 60. When the member 52 is moved downward from its horizontal position, the electrically conductive section 59 bridges the contacts 58 and a circuit is completed for solenoid 55 which becomes effective to open valve 54 against the action of resilient element 60. Hence, the member 52 constitutes a single manually movable element operable in a first lower position to connect only the burner 41 to the gas supply conduit 43, in a second higher position to connect only the electrical heating element 27 to the source of electrical supply through conductors 35 and 36, and in a third horizontal position intermediate the first and second positions to disconnect both the burner 41 and heating element 27 from the gas supply and source of electrical supply, respectively.

Figure 2:
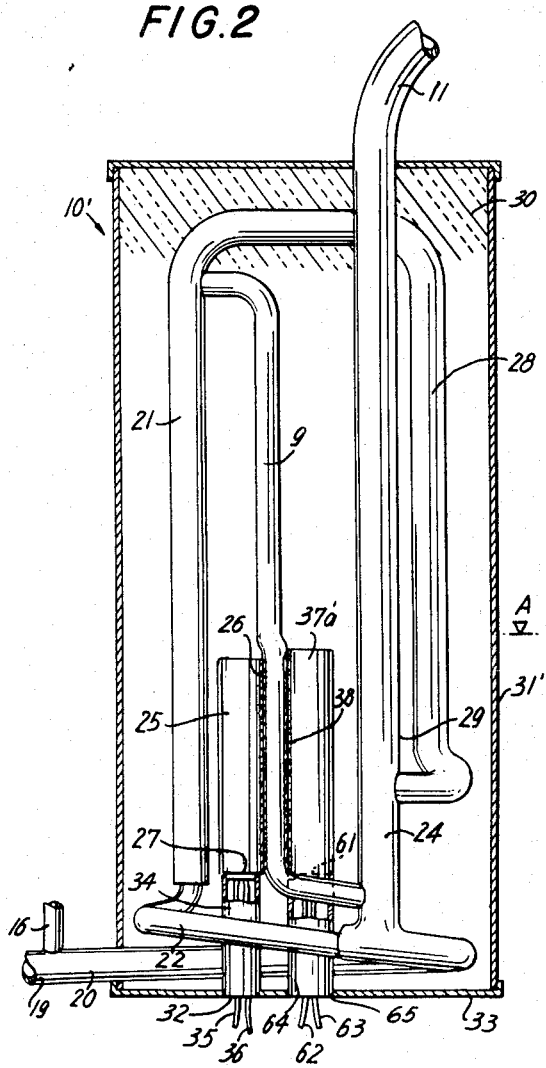
FIG. 2 is a fragmentary view of parts like those shown in FIG. 1 illustrating another manner in which the vapor-expulsion unit of FIG. 1 may be utilized.

The refrigeration apparatus of FIG. 1 may also be modified so that it can be operated at will by either of two heating elements adapted to be connected to different sources of electrical energy, such as sources of alternating current having different voltages or frequencies or respectively to sources of direct current and alternating current. Such an embodiment is shown in FIG. 2 in which parts similar to those illustrated in FIG. 1 are referred to by the same reference numerals. The vapor-expulsion unit 10' in FIG. 2 is like the unit 10 shown in FIG. 1 and described above and differs therefrom in that only the bottom tube 37a' of the heating flue 37 is employed, such bottom tube being closed at the top and arranged to be heated by an electrical heating element 61 disposed therein. Electrical conductors 62 and 63 for the heating element 61 extend through a hollow sleeve member 64 which is formed of insulating material and extends from the bottom of heating tube 37a' to a bottom opening 65 in the shell 31'.

Figure 5:
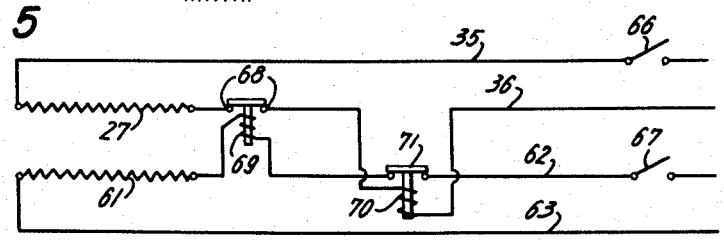
FIGS. 5 and 6 are diagrammatic representations of circuits for controlling the heating of the vapor-expulsion unit shown in FIG. 2.

The heating elements 27 and 61 constitute two independent sources of heat, each of which alone is capable of supplying heat at an adequate rate and at a sufficiently elevated temperature to effect normal operation of the refrigeration apparatus under all conditions under which the apparatus is intended to be operated. In order to prevent both heating elements 27 and 61 from being operated at the same time, a control arrangement like that diagrammatically illustrated in FIG. 5 may be employed. In FIG. 5 electrical heating element 27 is connected by conductors 35 and 36 to a first source of electrical energy, and heating element 61 is connected by conductors 62 and 63 to a different source of electrical energy. Switches 66 and 67 are provided in conductors 35 and 36, respectively.

When switch 67 is open and switch 66 is closed, a circuit is completed for heating element 27 through the normally closed contacts 68 of relay 69. When this occurs relay 70 is energized to open its contacts 71. When switch 67 is now closed in an attempt to complete a circuit for heating element 61, the latter cannot be rendered operable to supply heat to the vapor-expulsion unit 10' because the contacts 71 of relay 70 are open. Conversely, when switch 66 is open and switch 67 is closed, a circuit is completed for heating element 61 through normally closed contacts 71 of relay 70. When this occurs relay 69 is energized to open its contacts 68. When switch 66 is now closed in an attempt to complete a circuit for heating element 27, the latter cannot be rendered operable to supply heat to the vapor-expulsion unit 10' because the contacts 68 of relay 69 are open.

Figure 6:
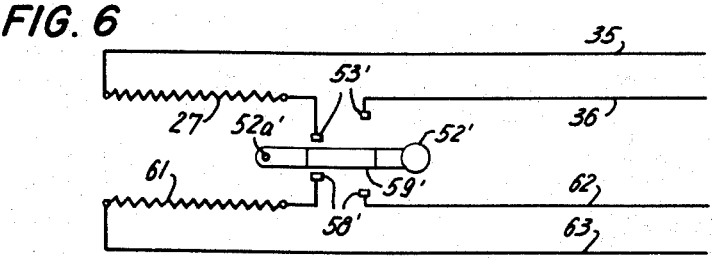

In the control arrangement of FIG. 5, each source of heat employed to operate the refrigeration apparatus cannot be disturbed when an attempt is made to operate the apparatus with the other source of heat and will continue to operate the refrigeration apparatus until it is rendered inoperable to supply heat to the vapor-expulsion unit 10'. In FIG. 6 is illustrated a form of control like that shown in FIG. 4 and described above in which the source of heat can be shifted at will from one to the other by moving a single control member 52'. In FIG. 6 electrical heating elements 27 and 61 are connected to different sources of electrical energy by conductors 35, 36 and 62, 63, respectively. Pairs of spaced contacts 53' and 58' are provided in conductors 36 and 62, respectively. When the control member 52' is moved upward about its pivot 52a', so that the electrically conductive section 59' bridges the contacts 53', a circuit will be completed for electrical heating element 27; and when control member 52' is moved downward so that the electrically conductive section 59' thereof bridges the contacts 58', a circuit will be completed for electrical heating element 67.

In view of the foregoing, it will now be understood that in the embodiment of FIG. 1, for example, the hollow sleeve 25, which may be referred to as a first heating member of a first heating system, is permanently connected at 26 to the vapor lift pipe 9 which serves as the heat receiving part of the refrigeration apparatus. The hollow sleeve 37a, which may be referred to as a second heating member of a second heating system, is permanently connected at 38 to the same vapor lift pipe 9.

The electrical heating element 27, which may be referred to as a first heater, functions to produce or generate heat to heat the first heating member 25, and the electrical conductors 35 and 36 connect the first heater 27 to a source of electrical energy which may be referred to as a first primary source of energy to render the heater 27 operable to produce heat.

The hollow sleeve 37a, which may be referred to as a second heating member and is permanently connected at 38 to the vapor lift pipe 9, forms a part of the flue 37. The flue 37 and the gas burner 41, which may be referred to as a second heater, function to produce heat to heat the second heating member 37a. As seen in FIG. 3, the gas pipe 43 connects the second heating member to a source of gaseous fuel which may be referred to as a second primary source of energy to render the second heater 41 operable to produce heat.

Each one of the heaters 27 and 41, when producing heat derived from the primary source of heat associated therewith, functions in such manner that it alone is capable of producing heat at an adequate rate and at a sufficiently elevated temperature for the heating member or hollow sleeve associated therewith to effect normal operation of the refrigeration apparatus under all conditions under which the apparatus is intended to be operated.

In view of the foregoing, it will now be understood that the gas pipe 43 functions as a means for supplying gas energy in the form of a combustible gas to the burner 41, and that the electrical conductors 35 and 36 function as a means for conducting electrical energy to the electrical heating element 27. In FIG. 3 the switch mechanism 42 and valve mechanism 44 and electrical controls operatively associated with these mechanisms constitute means for selectively connecting either the gas pipe 43 to the burner 41 or the electrical conductors 35 and 36 to the electrical heating element 27 whenever both electricity and gas are available as sources of power for the refrigerating system. The movable arm 44a of the valve mechanism 44 and the movable arm of the switch 42 form components of the selective connecting means and may be operated at will to obtain the desired source of power for the refrigeration unit. However, the gas pipe 43 and the electrical conductors 35 and 36 cannot be connected to the burner 41 and electrical heating element 27, respectively, at the same time.

As explained above, the arm 44a is operable to actuate the valve mechanism 44 to connect the gas conduit 43 to the burner 41 only when the electrical conductors 35 and 36 are disconnected from the electrical heating element 27 by the switch mechanism 42; and the movable arm of the switch mechanism 42 is operable to actuate the switch mechanism to connect the electrical conductors 35 and 36 to the electrical heating element 27 only when the gas conduit 43 is disconnected from the burner 41 by the valve mechanism 44.

While particular embodiments of the invention have been shown, it will be apparent that modifications may be made without departing from the spirit and scope thereof, as set forth in the claims.

We claim:

1. In absorption refrigeration apparatus, a vapor-expulsion unit having a heat receiving structure for expelling refrigerant from absorption solution therein, first and second heating systems for the apparatus, the first heating system comprising a first member, first means for heat conductively connecting said first member to said structure, a first heater for heating said first member, first means for connecting said first heater to a first source of heat, the second heating system comprising a second member, second means for heat conductively connecting said second member to said structure, a second heater for heating said second member, second means for connecting said second heater to a second source of heat, said first heater comprising an electrical heating element and said second heater comprising a fluid fuel burner, said first member comprising a hollow sleeve within which said heating element is disposed and said second member forming a part of a heating flue, said fluid fuel burner being arranged to effect heating of said heating flue, means including a pipe for supplying fluid fuel to said burner, said first means for connecting said first heater to the first source of heat comprising a first circuit including a first pair of electrical conductors, a valve in said pipe, and means operable to close said valve when said first circuit is completed.

2. Apparatus as set forth in claim 1 which includes means for urging said valve to its open position, and means operable when said first circuit is open to render said last-mentioned means operable to open said valve.

3. In absorption refrigeration apparatus, a vapor-expulsion unit having a heat receiving structure for expelling refrigerant from absorption solution therein, first and second heating systems for the apparatus, the first heating system comprising a first heating member, first means for permanently heat conductively connecting said first heating member to said structure, a first heater for heating said first heating member, first means for connecting said first heater to a first source of heat, the second heating system comprising a second heating member, second means for permanently heat conductively connecting said second heating member to said structure, a second heater for heating said second heating member, second means for connecting said second heater to a second source of heat, each of said heating systems being so constructed and formed that, when heated by heat derived from the source of heat associated therewith, each of said first and second heating members alone is capable of supplying heat at an adequate rate and at a sufficiently elevated temperature to effect normal operation of the refrigeration apparatus under all conditions under which the apparatus is intended to be operated, means for shifting operation of the refrigeration apparatus at will from one heater to the other heater, and means whereby the refrigeration apparatus can only be operated by one or the other of said heaters at a time.

4. In absorption refrigeration apparatus, a vapor-expulsion unit having a heat receiving structure for expelling refrigerant from absorption solution therein, first and second heating systems for the apparatus, the first heating system comprising a first member, first means for heat conductively connecting said first member to said structure, a first heater for heating said first member, first means for connecting said first heater to a first source of heat, the second heating system comprising a second member, second means for heat conductively connecting said second member to said structure, a second heater for heating said second member, and second means for connecting said second heater to a second source of heat, each of said heating systems being so constructed and formed that, when heated by heat derived from the source of heat associated therewith, each of said first and second heating members alone is capable of supplying heat at an adequate rate and at a sufficiently elevated temperature to effect normal operation of the refrigeration apparatus under all conditions under which the apparatus is intended to be operated, means for shifting operation of the refrigeration apparatus at will from one heater to the other heater, and means whereby one of said heaters is rendered incapable of operating the refrigeration apparatus while the latter is being operated by the other of said heaters.

5. Apparatus as set forth in claim 4 which includes means for rendering one of said heaters operable to operate the refrigeration apparatus only after operation of the refrigeration apparatus by the other of said heaters has been terminated.

6. In absorption refrigeration apparatus of the kind in which absorption solution circulates in a circuit in which refrigerant is expelled from solution at a place of heating and refrigerant vapor is absorbed into solution at a place of absorption, the place of heating comprising an upright heat receiving member having an upstanding outer side wall defining a substantially vertical space which holds a vertical column of absorption solution, a plurality of upright elongated heating members each having an upstanding side wall of annular form which is disposed exteriorly of said upright heat receiving member, means for permanently heat conductively connecting the side wall of each of said heating members along its length to the upstanding outer side wall of said heating member along its length, whereby the column of absorption solution in said heat receiving member always receives heat at its outer periphery from each of said heating members, and means for respectively heating each of said heating members by different sources of heat, and said upright elongated heating members being so constructed and formed that when heated by heat derived from the source of heat associated therewith, each of said heating members alone is capable of supplying heat at an adequate rate and at a sufficiently elevated temperature to said heat receiving member to effect normal operation of the refrigeration apparatus under all conditions under which the apparatus is intended to be operated.

7. In absorption refrigeration apparatus of the kind in which absorption solution circulates in a circuit in which refrigerant is expelled from solution at a place of heating and refrigerant vapor is absorbed into solution at a place of absorption, the place of heating comprising an upright heat receiving member of annular form having an upstanding outer side wall defining a substantially vertical space which holds a vertical column of absorption solution, first and second heating systems for the apparatus, the first heating system comprising a first upright hollow sleeve which is disposed exteriorly of said upright heat receiving member and functions as a first heating member, means for permanently heat conductively connecting the exterior surface of the wall of said first hollow sleeve along its length to the exterior surface of the upstanding outer side wall of said heat receiving member along its length, a first heater arranged to heat the inner surface of said first hollow sleeve, the second heating system comprising a second upright hollow sleeve which is disposed exteriorly of said upright heat receiving member and functions as a second heating member, means for permanently heat conductively connecting the exterior surface of the wall of said second hollow sleeve along its length to the exterior surface of the upstanding outer side wall of said heat receiving member along its length, a second heater arranged to heat the inner surface of said second upright hollow sleeve, and each of said heating systems being so constructed and formed that, when heated by heat derived from the source of heat associated therewith, each of said first and second hollow sleeves alone is capable of supplying heat at an adequate rate and at a sufficiently elevated temperature to said heat receiving member to effect normal operation of the refrigeration apparatus under all conditions under which the apparatus is intended to be operated.

8. Apparatus as set forth in claim 7 in which said first heater comprises an electrical heating element disposed within said first hollow sleeve, a heating flue which includes said second hollow sleeve, said second heater comprising a fluid fuel burner arranged to effect heating of said heating flue.

9. In absorption refrigeration apparatus of the kind in which absorption solution circulates in a circuit in which refrigerant is expelled from solution at a place of heating and refrigerant vapor is absorbed into solution at a place of absorption, the place of heating comprising an upright tube which functions as the only heat receiving member of the apparatus and through which liquid is raised by vapor-liquid lift action for circulating solution in said circuit, said upright tube having an upstanding outer side wall defining a substantially vertical space which holds a vertical column of absorption solution, first and second heating systems for the apparatus, the first heating system comprising an upright hollow sleeve which is disposed exteriorly of said upright tube and functions as a first heating member, means for permanently heat conductively connecting the exterior surface of the wall of said first hollow sleeve along its length to the exterior surface of the upstanding outer side wall of said tube along its length, a first heater arranged to heat the inner surface of said first hollow sleeve, the second heating system comprising a second upright hollow sleeve which is disposed exteriorly of said upright tube and functions as a second heating member, means for permanently heat conductively connecting the exterior surface of the wall of said second hollow sleeve along its length to the exterior surface of the upstanding outer side wall of said tube along its length, a second heater arranged to heat the inner surface of said second upright hollow sleeve, and each of said heating systems being so constructed and formed that, when heated by heat derived from the source of heat associated therewith, each of said first and second hollow sleeves alone is capable of supplying heat at an adequate rate and at a sufficiently elevated temperature to said tube to effect normal operation of the refrigeration apparatus under all conditions under which the apparatus is intended to be operated.

10. A refrigerating system of the type alternatively employing gas or electricity as power sources, in which cooling is effected by a refrigeration unit comprising a generator tube, a gas burner heating means operable to maintain a flame burning in the atmosphere for producing combustion gases at an elevated temperature and for heating said generator tube by heat derived from said combustion gases substantially at said elevated temperature, first means for supplying gas energy to said burner heating means, electrical heating means mounted on the outer surface of said tube for heating said generator tube, second means for conducting electrical energy to said electrical heating means, control means connected to said first gas energy supply means and to said second electrical energy conducting means which is operable to connect and disconnect one or the other of said first and second energy means to and from its associated heating means, and said control means including structure whereby either one of said first and second energy means must be disconnected from its associated heating means before said control means is operable to connect the other of said first and second energy means to its associated heating means.

11. A refrigerating system of the type alternatively employing gas or electricity as power sources, in which cooling is effected by a refrigeration unit comprising a generator tube, a gas burner heating means operable to maintain a flame burning in the atmosphere for producing combustion gases at an elevated temperature and for heating said generator tube by heat derived from said combustion gases substantially at said elevated temperature, first means for supplying gas energy to said burner heating means, electrical heating means mounted on the outer surface of said tube for heating said generator tube, second means for conducting electrical energy to said electrical heating means, and control means connected to said first gas energy supply means and to said secod electrical energy conducting means which is operable to connect and disconnect one or the other of said first and second energy means to and from its associated heating means and ineffective to connect either one of said first and second energy means to its associated heating means while the other of said first and second energy means remains connected to its associated heating means by said control means.

12. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling refrigerant vapor out of solution in said generator member by heat derived from said combustion gases substantially at said elevated temperature, means for supplying gas energy in the form of a combustible gas to said burner heating means, electrical heating means heat conductively connected to an outer surface of said generator member and operable to expel refrigerant vapor out of solution in said generator member, means for conducting electrical energy to said electrical heating means, and means for selectively connecting either one of said energy means to its associated heating means whenever both electricity and gas are available as sources of power for the refrigerating system, said last-mentioned means comprising structure operable at will to connect and disconnect one or the other of said energy means to and from its associated heating means and ineffective to connect both of said energy means to their associated heating means at the same time.

13. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling vapor out of solution in said generator member by heat derived from said combustion gases substantially at said elevated temperature, first means for supplying gas energy in the form of a combustible gas to said burner heating means, valve mechanism operable to connect and disconnect said gas burner heating means to and from said first gas energy supply means, electrical heating means heat conductively connected to an outer surface of said generator member and operable to expel refrigerant vapor out of solution in said generator member, second means for conducting electrical energy to said electrical heating means, switch mechanism operable to connect and disconnect said electrical heating means to and from said second electrical energy conducting means, and means including said valve mechanism and said switch mechanism for selectively connecting either one of said first and second energy means to its associated heating means whenever both electricity and gas are available as sources of power for the refrigerating system, said last-mentioned means comprising structure operable at will to actuate said valve mechanism to connect said first energy means to its associated heating means only when said second energy means is disconnected from its associated heating means by said switch mechanism and to actuate said switch mechanism to connect said second energy means to its associated heating means only when said first energy means is disconnected from its associated heating means by said valve mechanism.

14. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling vapor out of solution in said generator member by heat derived from said combustion gases substantially at said elevated temperature, first means for supplying gas energy in the form of a combustible gas to said burner heating means, electrical heating means heat conductively connected to an outer surface of said generator member and operable to expel refrigerant vapor out of solution in said generator member, second means for conducting eletcrical energy to said electrical heating means, and means for selectively connecting either one of said first and second energy means to its associated heating means whenever both electricity and gas are available as sources of power for the refrigerating system, said last-mentioned means comprising structure operable at will to disconnect both of said first and second energy means from their associated heating means at the same time and connect either one of said first and second energy means to its associated heating means only when the other of said first and second energy means is disconnected from its associated heating means.

15. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling vapor out of solution in said generator member by heat derived from said combustion gases substantially at said elevated temperature, first means for supplying gas energy in the form of a combustible gas to said burner heating means, valve mechanism operable to connect and disconnect said gas burner heating means to and from said first gas energy supply means, electrical heating means heat conductively connected to an outer surface of said generator member and operable to expel refrigerant vapor out of solution in said generator member, second means for conducting electrical energy to said electrical heating means, switch mechanism operable to connect and disconnect said electrical heating means to and from said second electrical energy conducting means, said valve mechanism including a first element manually movable between an operable valve-open position and an inoperable valve-closed position to connect and disconnect said gas burner heating means to and from said first gas energy supply means, said switch mechanism including a second element manually movable between an operable switch-closed position and an inoperable switch-open position to connect and disconnect said electrical heating means to and from said second electrical energy conducting means, and means including said first and second manually movable elements for selectively connecting either one of said first and second energy means to its associated heating means whenever both electricity and gas are available as sources of power for the refrigerating system, said last-mentioned means comprising structure associated with said valve mechanism and said switch mechanism whereby either one of said first and second manually movable elements must be moved to its inoperable position to disconnect one of said energy means from its associated heating means before the other of said first and second manually movable elements can function to connect the other of said energy means to its associated heating means.

16. The combination with a refrigerating system of the type alternatively employing gas or electricity as power sources, in which cooling is effected by an absorption refrigeration unit having a vapor-expulsion unit in which refrigerant vapor is expelled out of solution, of a gas burner heating means which is operable to maintain a flame burning in the atmosphere for producing heated combustion gases, the expulsion of refrigerant vapor out of solution in the vapor-expulsion unit being effected by heat derived from the heated combustion gases, means for supplying gas energy in the form of a combustible gas to said burner heating means, electrical heating means heat conductively connected to an outer surface of the vapor-expulsion unit and operable to expel refrigerant vapor out of solution in the vapor-expulsion unit, means for conducting electrical energy to said electrical heating means, and means for selectively connecting either one of said energy means to its associated heating means whenever both electricity and gas are available as sources of power for the refrigerating system, said last-mentioned means comprising structure operable at will to connect and disconnect one or the other of said energy means to and from its associated heating means and ineffective to connect both of said energy means to their associated heating means at the same time.

17. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling vapor out of solution in said generator member by heat derived from said combustion gases substantially at said elevated temperature, first means for supplying gas energy in the form of a combustible gas to said burner heating means, electrical heating means which is heat conductively connected to an outer surface of said generator member and operable to expel refrigerant vapor out of solution in said generator member, second means for conducting electrical energy to said electrical heating means, means for selectively connecting either one of said first and second energy means to its associated heating means whenever both electricity and gas are available as sources of power for the refrigerating system, said last-mentioned means comprising structure including a first element movable at will between operable and inoperable positions to connect and disconnect said first energy means to and from its associated heating means and a second element movable at will between operable and inoperable positions to connect and disconnect said second energy means to and from its assoicated heating means, and means embodied in said structure whereby either one of said first and second movable elements must be moved to its inoperable position to disconnect one of said first and second energy means from its associated heating means before the other of said first and second movable elements can function to connect the other of said first and second energy means to its associated heating means.

18. A refrigerating system of the type alternatively employing gas or electricity as power sources, in which cooling is effected by an absorption refrigeration unit comprising a generator member in which refrigerant vapor is expelled out of solution, a gas burner heating means operable to maintain a flame burning in the atmosphere for producing combustion gases at an elevated temperature and for expelling vapor out of solution in said generator member by heat derived from said combustion gases substantially at said elevated temperature, means for supplying gas energy in the form of a combustible gas to said burner heating means, electrical heating means heat conductively connected to an outer surface of said generator member and operable to expel refrigerant vapor out of solution in said generator member, means for conducting electrical energy to said electrical heating means, and means for selectively connecting either one of said first and second energy means to its associated heating means whenever both electricity and gas are available as sources of power for the refrigerating system, said last-mentioned means comprising structure including a single manually movable element operable at will to a first position to connect only one of said energy means to its associated heating means and to a second position to connect only the other of said energy means to its associated heating means and to a third position intermediate the first and second positions to disconnect both of said energy means from their associated heating means.

References Cited by the Examiner

UNITED STATES PATENTS

| | | | |
|---|---|---|---|
| 1,729,355 | 9/29 | Munters | 62—497 |
| 1,854,090 | 4/32 | Wright | 62—143 |
| 1,955,345 | 4/34 | Sarnmark | 62—112 |
| 1,972,427 | 9/34 | Normelli | 62—106 |
| 2,009,067 | 7/35 | Mulholland | 62—148 |
| 2,181,376 | 11/39 | Lynger | 62—81 |
| 2,269,099 | 1/42 | Grubb | 62—104 |
| 2,363,771 | 11/44 | Bergholm | 62—487 |
| 3,000,196 | 9/61 | Kogel | 62—487 |

ROBERT A. O'LEARY, *Primary Examiner.*